(12) United States Patent
Starck

(10) Patent No.: US 6,419,512 B2
(45) Date of Patent: Jul. 16, 2002

(54) SYSTEM FOR INTERCONNECTING MEDIUM-VOLTAGE OR HIGH-VOLTAGE ELECTRICAL CELLS IN ENCLOSURES

(75) Inventor: Thierry Starck, Castries (FR)

(73) Assignee: Aestom, Paris (FR)

( * ) Notice: Subject to any disclaimer, the term of this patent is extended or adjusted under 35 U.S.C. 154(b) by 0 days.

(21) Appl. No.: 09/740,785

(22) Filed: Dec. 21, 2000

(30) Foreign Application Priority Data

Dec. 22, 1999 (FR) .............................................. 99 16245

(51) Int. Cl.[7] .................................................. H01R 13/52
(52) U.S. Cl. ...................................................... 439/278
(58) Field of Search ................................ 439/278, 559, 439/821, 141, 819, 88, 89; 174/38, 13

(56) References Cited

U.S. PATENT DOCUMENTS 3,767,840 A  * 10/1973 Cronin et al. ................. 174/13
3,842,187 A  * 10/1974 Barkan ......................... 174/38
5,257,161 A    10/1993 Ocerin
5,904,577 A  *  5/1999 Swanson et al. ................ 439/8
5,980,290 A  * 11/1999 Meynier et al. ............. 439/248

FOREIGN PATENT DOCUMENTS

| DE | 197 37 429 A1 | 2/1999 |
| EP | 0 199 249 A1 | 10/1986 |
| FR | 2 115 319 | 7/1972 |

* cited by examiner

Primary Examiner—Brian Sircus
Assistant Examiner—Phuong Dinh
(74) Attorney, Agent, or Firm—Sughrue Mion, PLLC

(57) ABSTRACT

The system for interconnecting pairs of aligned axial conductors of cells housed in enclosures (3, 3') equipped with bushings (1, 1') is made up of modules each consisting of an interconnection device (8) and an electrical insulation structure positioned around the interconnection device. The electrical insulation structure is a flexible insulative sleeve (12) of elastically adaptable length whose flat annular ends are pressed by removable clamps (13, 13') against the bushings (1, 1') through which the conductors of the connection device pass.

11 Claims, 4 Drawing Sheets

SYSTEM FOR INTERCONNECTING MEDIUM-VOLTAGE OR HIGH-VOLTAGE ELECTRICAL CELLS IN ENCLOSURES

BACKGROUND OF THE INVENTION

The invention relates to a system for interconnecting medium-voltage or high-voltage electrical cells housed in shielded, hermetically sealed and gas-insulated enclosures, which include sealed bushings whose respective axial conductors each have one accessible outside connecting end. The system is designed to interconnect conductors of two adjoining cells when the conductors of one cell are aligned with those of the other cell so that a conductor of one cell is aligned with a conductor of an adjacent cell and the outside connecting ends of the conductors of adjacent cells which are aligned in pairs are close together.

A system of the above kind is described in particular in European Patent EP-0 520 933 in which the bushings, which are carried by two adjoining enclosures and which have their axial conductors aligned, each include a frustoconical opening which is open towards the outside of the enclosure carrying it. An elastomer material connecting sleeve which has a double conical shape on the outside surrounds an interconnection device which electrically connects together the axial conductors of the bushings. The sleeve is compressed between the two bushings, with each of which it forms a frustoconical seal. The interconnection device is made up of conductive members whose ends are pressed outwards by peripheral springs around the outside connecting ends of two axial conductors to be interconnected. Thus the outside connecting ends of conductors aligned in pairs of adjoining enclosures are interconnected by means of modules of the interconnection system, each of which includes an interconnection device accommodated in an electrical insulation structure essentially consisting of a sleeve, as described above.

Moving an enclosure which is not at the end of a succession of aligned enclosures interconnected by means of the above system necessarily implies moving at least one of the adjoining enclosures and extracting the sleeves and the interconnection devices of all the modules between the enclosure to be moved and the adjoining two enclosures. What is more, unless all the enclosures on one side of an enclosure to be removed are moved, it cannot be removed without working inside at least one enclosure, which is filled with a protective gas which as a general rule must not be allowed to escape.

German Patent Application DE-19737429 describes a system which does not have the drawbacks of the system described above.

The connecting ends of the aligned axial conductors to be interconnected, which are carried by two bushings mounted on adjacent enclosures, project out from the enclosures as respective asymmetrical longitudinal flats. An interconnection device consists of a removable elongate conductive member whose ends have flats complementary to those on the conductors, so that the flats of the member can be screwed to those of the conductors. The removable member can be mounted and demounted from the outside, without moving any of the adjacent enclosures sideways, in particular in the event of replacing an enclosure. An electrical insulation structure must of course be associated with the conductive member of an interconnection device. It consists of an insulative sheath which covers the greater part of the member, but not its ends, and two sleeves mounted at opposite ends of the sheath and partly covering it. The sleeves are placed against the bushings from which the outside connecting ends of the conductors project, to establish continuity of insulation, which leads to some complexity and to the use of a large number of components.

SUMMARY OF THE INVENTION

The object of the invention is to provide a simple system for interconnecting medium-voltage or high-voltage electrical cells housed in shielded, hermetically sealed and gas-insulated enclosures, which system costs little to manufacture and use, entailing neither manipulation of gases nor lateral displacement of adjoining cells to replace a cell at a position intermediate between the ends of the row of cells.

The interconnecting system is constituted by modules, with each module being disposed between two medium-voltage or high-voltage electrical cells housed in shielded, gas-insulated and hermetically sealed enclosures which include sealed and insulative bushings, the respective axial conductors of said bushings being aligned in pairs and each having an accessible outside connecting end, two adjacent ends of axial conductors of adjoining bushings being electrically connected together by an interconnecting device constituting the system and surrounded by a tubular electrically insulating structure that is approximately coaxial with the axial conductors and constituted by a flexible insulative sleeve of elastically adaptable length, each annular end of a sleeve being fixed to a bushing by removable fixing means.

According to a feature of the invention, the sleeve has a longitudinal central portion which includes a projecting annular fold forming a return spring, and in that said sleeve has, between said central portion and at least one of its two annular flat ends, a longitudinal zone which includes a re-entrant annular fold so that the inside surface of said sleeve is locally in contact with an axial conductor at said zone, said inside surface being covered by a semiconductive layer that is put to the same potential as the axial conductors.

According to another feature of the invention each interconnecting system includes an interconnection device mounted so that it can be moved in translation on the outside connecting end of a first axial conductor which projects outwards by an amount slightly less than the distance between the adjoining bushings of said conductors, so that it can be partially housed inside a cavity provided at the outside connecting end of each of the two aligned axial conductors electrically connected by the device, the outside connecting end of the first axial conductor including a cavity whose depth is chosen to enable the interconnection device to be withdrawn into it by movement in translation to disconnect the two aligned axial conductors.

In a first embodiment of the invention the interconnection device of a system includes a bush which has a cylindrical body extended by a threaded bore which screws into a threaded bore at the closed end of a stepped blind end cavity provided for the bush in the outside connecting end of the first axial conductor to be connected, the cylindrical body of the bush continuing to be electrically connected by means of sliding contacts to the inside of the corresponding diameter stage of the cavity, from which it protrudes more or less according to how far in the bush is screwed, and the projecting end of the cylindrical body of the bush coming into sliding contact with a blind cavity of corresponding diameter formed at the outside connecting end of the second axial conductor, into which said cylindrical body end penetrates when unscrewed sufficiently and connects the two axial conductors with which the cylindrical body of the bush is then simultaneously in contact.

In a first variant of the invention the interconnection device of a system includes an assembly of two contact half-shells in contact which are elastically spread apart in order to come separately into contact with the outside connecting ends of two axial conductors to be connected, in the blind end cavity of each of said conductors, from a closely spaced position of the half-shells which enables them to penetrate into said end cavities and which is obtained by the action of a screw on which the two half-shells are mounted. The assembly can be moved longitudinally at the greatly projecting outside connecting end of the first axial conductor between a position enabling the two half-shells to be kept in contact with the axial conductors in the cavities of which they are partially inserted and a position in which the two half-shells are inserted only in the cavity at the outside connecting end of the first axial conductor.

In a second variant of the invention the interconnection device includes an assembly of two contact half-shells in contact which are elastically spread apart in order to come separately into contact with the outside connecting ends of two axial conductors to be connected, of the hollow tube type, at an outside connecting end of the tube formed by each conductor, from a closely spaced position of the half-shells which enables them to penetrate into the adjoining ends of the two tubes and which is obtained by the action of a screw on which the two half-shells are mounted. The half-shells are mounted on the shank of the screw by means of which they are fastened to an outside connecting end of the tube of the first axial conductor which projects outwardly by an amount corresponding to the distance between the adjoining two bushings through each of which one of the tubes passes. The assembly can be moved longitudinally at the outside connecting end of the first axial conductor between a position enabling the two half-shells to be kept in contact with the two tubes into which they are partially inserted and a position in which the two half-shells are inserted only in the cavity at the greatly projecting outside connecting end of the tube forming the first axial conductor.

BRIEF DESCRIPTION OF THE DRAWINGS

The invention and its features and advantages are explained in the following description, which is given with reference to the figures listed below.

DETAILED DESCRIPTION OF THE INVENTION

Figure 1:
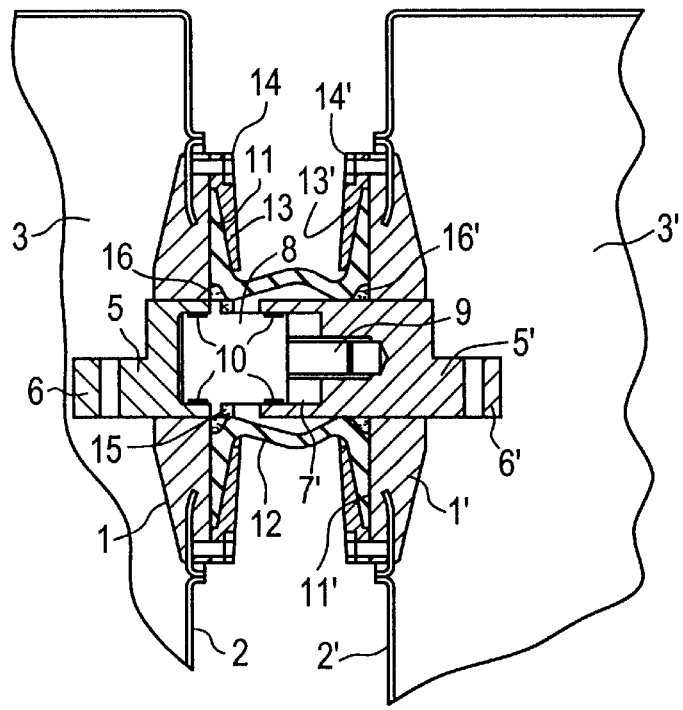
FIGS. 1 and 2 show in axial section a system for interconnecting two aligned axial conductors of bushings mounted on two adjoining enclosures. The conductors are interconnected in FIG. 1 and disconnected in FIG. 2.

The system shown in FIG. 1 includes two sealed bushings 1, 1' mounted on two parallel adjacent walls 2, 2' of two adjoining enclosures 3, 3' which are shielded, hermetically sealed and filled with an insulative gas, and which contain electrical switchgear and in particular medium-voltage or high-voltage switchgear. The bushings are made from insulative materials and in this example each is molded over a metal bearer member 4, 4' which is welded into a complementary opening provided for it in one of the walls. A conductor 5, 5', which in this example is an insert, passes axially through each bushing and has one connecting end outside the enclosure and one connecting end inside the enclosure. The axial conductors to be connected are aligned in pairs on respective opposite sides of a gap between the two adjoining walls of the two adjoining enclosures which carry them. Pairs of aligned axial conductors are connected in a modular fashion, each module including an interconnection device associated with a tubular electrical insulation structure for two conductors to be connected.

Figure 2:
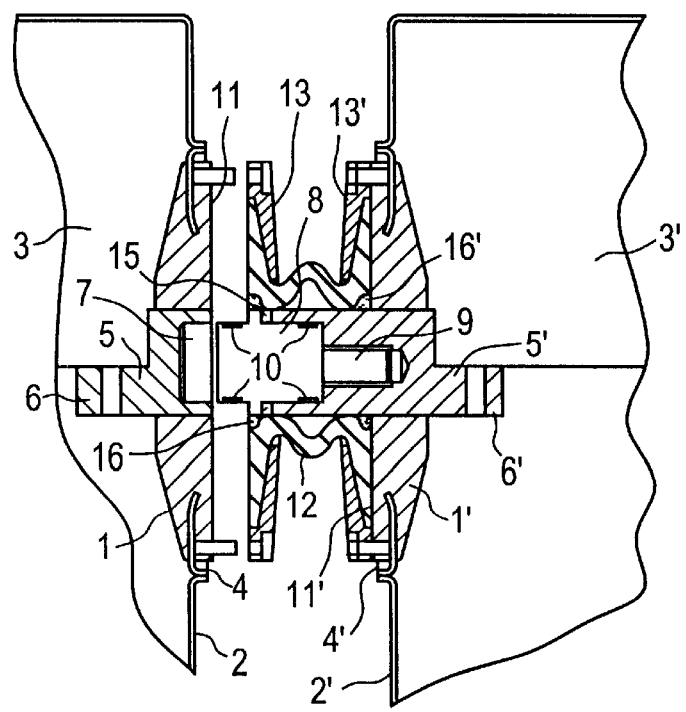

In the example shown in FIGS. 1 and 2, the outside connecting ends 6, 6' of the two axial conductors 5, 5' to be connected each form a flat, longitudinal and asymmetrical connecting lug including a transverse fixing hole for a complementary lug of a switchgear unit. The outside connecting ends of the axial conductors 5, 5' have respective end cavities 7, 7' which can be seen in FIGS. 2 and 1, respectively, and which are blind cavities in the sense that they have a closed end in the embodiment shown in these two figures. In this example the cavities 7, 7' are cylindrical and they are adapted to receive a conductive bush 8 which interconnects the conductors 5, 5' when it is positioned so that it is partly accommodated in each of the cavities 7, 7', which have their open ends face-to-face. One of the cavities 7, 7' is deeper than the other one and can receive a greater length of the bush 8, enabling it to be withdrawn from the other cavity. In the embodiment shown here, the bush includes a threaded rod 9 which is screwed into a threaded bore in the bottom of the deeper cavity 7'. Turning the bush in one direction (screwing it in) causes it to enter the cavity 7' and turning it in the opposite direction (unscrewing it) withdraws it, the distance between the outside ends of the axial conductors 5, 5' being chosen in conjunction with the longitudinal dimensions of the bush 8 to enable the bush to enter the cavity 7 of the conductor 5 with which it comes into contact after being unscrewed a predetermined minimum amount. In this embodiment, electrical contact is made between the bush 8 and each of the contacts 5, 5' inside the cavity 7, 7' by sliding contacts 10 which are peripherally mounted in the vicinity of the ends of the bush 8, as is well-known in the connector art. The axial displacement of the interconnection device, which in this embodiment is formed by the bush 8, is chosen to enable satisfactory contact with the axial conductor 5 to be obtained when the bush has reached a position, referred to as the interconnection position, in which it is simultaneously inside the cavities 7 and 7' and makes an electrical connection between the axial conductors 5 and 5'. It is also chosen to allow the bush to be withdrawn a sufficient distance from the end of the axial conductor 5 to prevent electrical connection between the conductors 5 and 5', in this embodiment after screwing it in by an appropriate amount. The resulting axial withdrawal of the bush 8 mechanically disengages the two axial conductors 5, 5' from each other. In the preferred embodiment shown here, one conductor 5 is mounted so that its outside connecting end does not project much if at all from the outside face 11 of the bushing 1 through which it passes. The other axial conductor 5' to which it to be connected is then adapted to project outwards from the outside face 11' of the bushing 1' through which it passes by an amount which is determined to suit the chosen distance between the bushings 1 and 1', which in practice is the distance between two adjacent enclosures. The projection of the axial conductor 5', the lengths of the bush 8 and its threaded rod 9 and the depths of the cavities 7 and 7' are chosen in a complementary manner to obtain the required interconnection and disconnection positions of the bush allowing for constraints relating to the distance between adjacent enclosures. The use of a bush that is axially movable in a simple manner, and in particular by screwing it in or unscrewing it, facilitates installing and replacing enclosures and the isolated movement of one enclosure, if necessary.

As indicated above, an electrical insulation structure must be associated with the interconnection system in a module such as described above because of the high electrical voltages of the switchgear and connections that the interconnection modules according to the invention are required to interconnect.

The various embodiments proposed here include a tubular electrical insulation structure module taking the form of a flexible material insulative sleeve 12. The sleeve can be compressed or stretched, as required, and is referred to as a sleeve of elastically adaptable length. In a preferred embodiment, the sleeve 12 has a tubular central section including at least one projecting annular fold serving as a return spring, as shown in FIGS. 1 and 2, in which the central section has a projecting annular fold in the middle. The ends of the sleeve 12 are preferably flat and annular so that each can be pressed against an outside face of one of the two bushings 1, 1' whose axial conductors 5, 5' are connected by the interconnection system housed in the sleeve. In the embodiments described, the outside faces of the bushings are preferably plane but could instead be frustoconical. The sleeve can be made from elastically deformable EPDM or silicone and its outside surface is covered with a semiconductor coating, except in areas corresponding to the faces of the sleeve which bear against the outside faces of the bushings.

Removable clamps 13, 13' press the flat ends of the sleeve 12 against the outside faces of the bushings 1 and 1'. In the embodiment shown in FIGS. 1 and 2, the clamps are bolted by means of bolts or screws 14, 14' to the enclosures, for example by means of peripheral threaded inserts in the bushings 1, 1'. The semiconductor coating is grounded, for example by the clamps 13, and is a layer of silicone charged with carbon, for example, which produces a weakly conductive equipotential surface. The inside surface of the sleeve is also coated with a layer of silicone charged with carbon, for example, forming a semiconductor coating that is in contact with the axial conductors 5, 5' and therefore at the hightension voltage.

In this embodiment, the sleeve has an M-shaped section, as can be seen in the sectional views of FIGS. 1 and 2, and covers the long projecting part of the axial conductor 5' and the short gap between the two conductors 5, 5' when the bush is in the interconnection position and the module is in place with the flat ends of the sleeve 12 pressed against the outside faces of the bushings 1, 1'. Removing the screws 14 separates the clamp 13 and the corresponding flat end of the sleeve from the bushing 1. It is then possible to move the flat end to the rear in order to move the interconnection system consisting of the bush 8 and thus, in this embodiment, to screw it in and disconnect it from the axial conductor 5. These operations provide a simple way of separating the axial conductors 5 of the modules between two enclosures, for example to move one of the enclosures. In the embodiment shown in FIGS. 1 and 2, a peripheral bead 15 near the end of the bush 8 enters the cavity 7. This entrains the flat end of the sleeve 12 with this end of the bush when the bush is screwed in.

To this end the bead co-operates with one of the annular semiconductor elastic material inserts 16, 16' inside the ends of the sleeve, which control the electric field where the sleeve bears against the end of a bushing and at the perimeter of the outside connecting end of the axial conductor that passes through the bushing. In this embodiment the insert 16 carried by the end of the sleeve which bears against the bushing 1 has a shoulder against which the bead bears. Note that the annular semiconductor inserts 16, 16' are preferably disposed at the two ends of the semiconductor coating on the inside of the sleeve.

Figure 3:
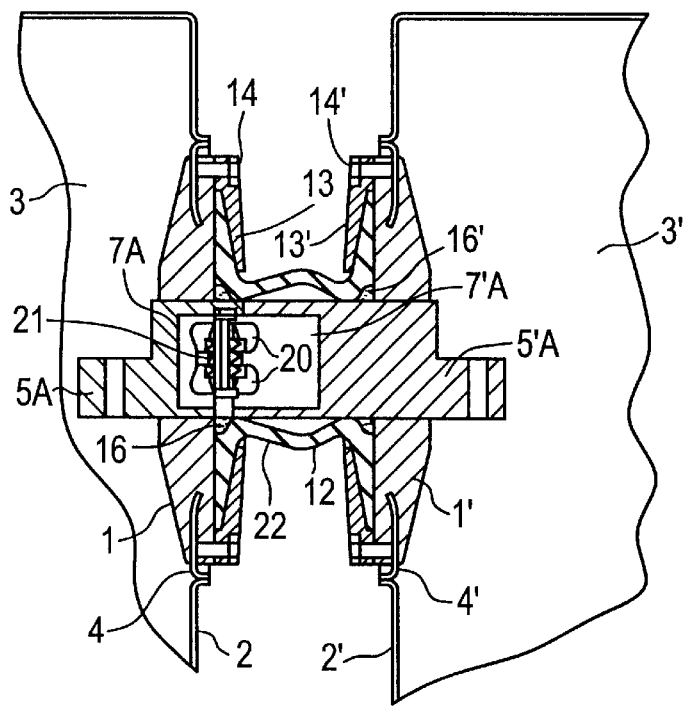
FIGS. 3 and 4 show in cross-section a first variant of a system for interconnecting aligned axial conductors which have a blind cavity at the end by means of a half-shell contact device. The conductors are interconnected in FIG. 3 and disconnected in FIG. 4.
Figure 4:
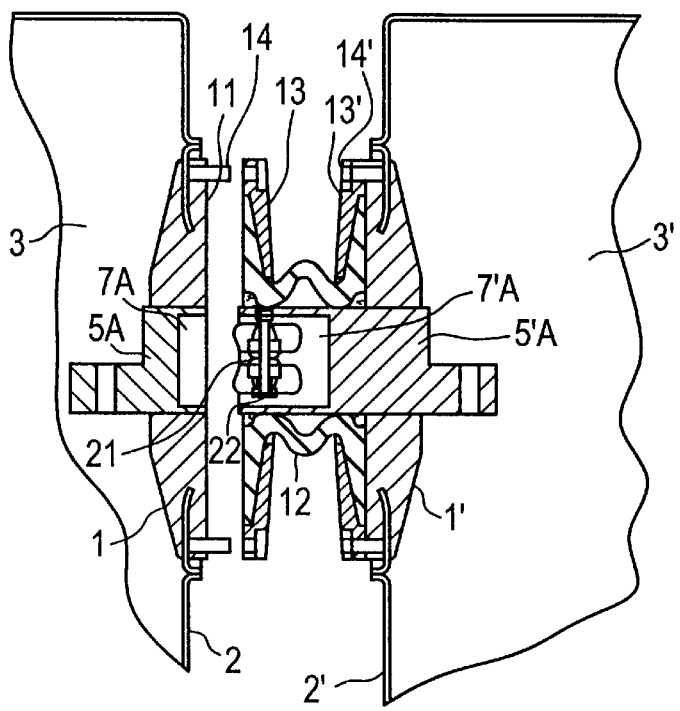

A variant interconnection system according to the invention is shown in FIGS. 3 and 4. It differs essentially from that described hereinabove in terms of its interconnection device. Components shown in FIGS. 3 and 4 which are identical to those shown in FIGS. 1 and 2 are designated by the same reference number and those which are slightly different are designated by the same reference number with the suffix A.

As previously, the aligned axial conductors 5A, 5'A to be connected have an outside connecting end which includes a blind cylindrical end cavity 7A or 7'A. One conductor 5A is mounted so that its outside connecting end does not project much if at all from the outside face 11 of the bushing 1 through which it passes. The other axial conductor 5'A to which it is to be connected projects outwards from the outside face 11' of the bushing 1' through which it passes by an amount which is determined according to the chosen distance between the bushings 1 and 1', which in practice is the distance between adjacent enclosures, as already mentioned. In this embodiment, the interconnection device is different and includes two contact half-shells 20 which are assembled with their respective concave sides facing towards each other and which are spring-loaded away from each other by a spring arrangement 21 so that they can be pressed onto the inside of one or both of the cavities 7 and 7A, according to the position of the device that includes them relative to the outside connecting ends of the axial conductors 5A, 5'A. This device is also used in the embodiments shown in FIGS. 5 to 9. In the proposed embodiment, the two contact half-shells 20 are mounted on a screw 22 which fastens them to the axial conductor 5'A, which is the one which projects to a greater distance and whose cavity is deeper. The screw 22 co-operates with a nut 23 to limit the distance between the half-shells to enable them to enter the cylinders of the cavities 7A, 7'A freely, despite the spreading force of the spring arrangement, unless they are released by unscrewing them. The spring arrangement 21 consists of a stack of spring washers mounted between the half-shells on the shank of the screw 22, for example.

In this embodiment, the cavity 7'A has a longitudinal groove 24 at the end which receives the head of the screw 22 and the screwhead moves along the axis of the groove between two predetermined positions. For a first of those positions the assembly formed by the halfshells and the spring arrangement mounted on the shank of the screw 22 is almost entirely housed within the cavity 7A, because the head of the screw 22 is at the bottom of the longitudinal groove 24. The half-shells can therefore be moved towards each other to enable penetration by screwing the screw 22 into the nut 23. For the second position, the assembly referred to above is partly positioned in each of the cavities 7A, 7'A of the two aligned axial conductors, with each half-shell partly engaged in each of the cavities, after the head of the screw 22 has reached open side of the groove 24, at the level of the outwardly projecting end of the axial conductor 5'A.

Figure 5:
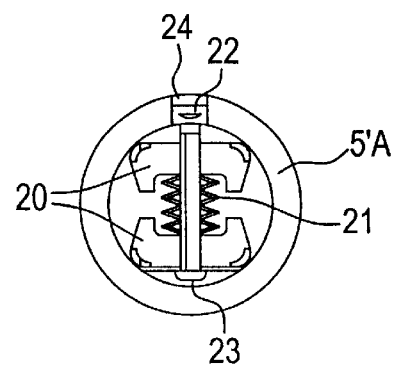
FIG. 5 is a side view of the half-shell contact device in contact inside an end cavity of one of the conductors.

Partly unscrewing the screw 22 then enables the half-shells to move apart and each of them to come into contact with one of the axial conductors 5A, 5'A inside the cylindrical end cavities 7A, 7'A, in the manner shown in FIG. 5 in the case of the conductor 5'A. The use of a half-shell interconnection device as described above provides a fast and easy way of fitting and replacing enclosures or moving one enclosure in isolation, and likewise the bush arrangement. It has the advantage of allowing angular and/or radial misalignment between the interconnected enclosures. Connection and disconnection can be effected with the aid of a simple tool, for example a screwdriver, and in a simple manner by virtue of the access provided by retraction of the sleeve and by the groove 24 at the end of the axial conductor 5'A. The assembly formed by the half-shells can be moved on the shank of the screw 22 whose head is engaged in the groove 24 by pushing it laterally, for example with the end of a screwdriver.

The electrical insulation structure adapted to be associated with the interconnection device constituted of the assembly of half-shells can be practically identical to that provided for the bush arrangement and for this reason it is not described again here.

Figure 6:
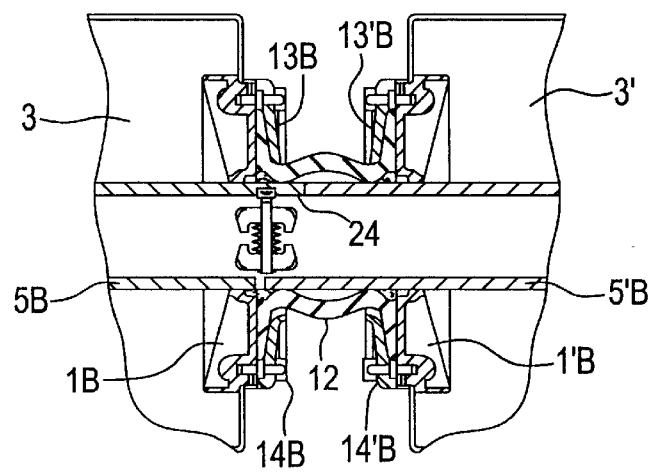
FIGS. 6, 7, 8 and 9 show in section a second variant of a system for interconnecting aligned axial conductors of the hollow tube type, by means of a half-shell contact device. The conductors are interconnected in FIG. 6 and disconnected in FIG. 7.
Figure 7:
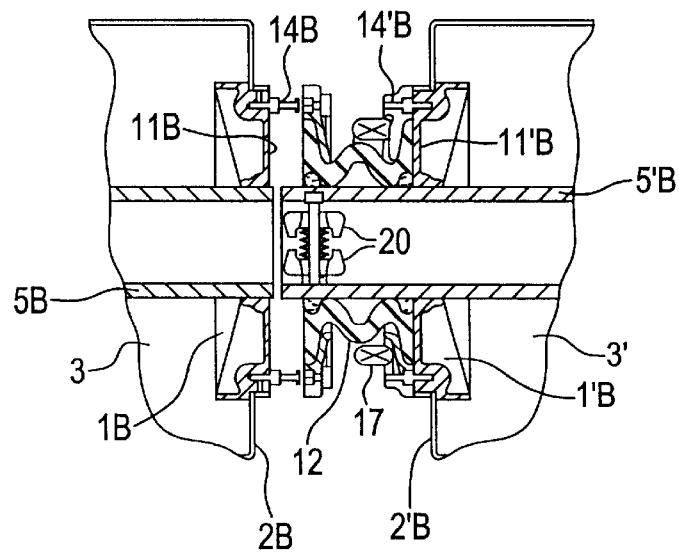

FIGS. 6 and 7 show a second variant interconnection system in accordance with the invention. It is more particularly intended for the situation in which the axial conductors are hollow tubes, in particular hollow tubes passing completely through the enclosures. The tubes enable the use of bushings which are simpler to manufacture and to install and therefore less costly, than the bushings previously described. As previously, components shown in FIGS. 6 to 11 which are identical to those shown in previous figures are designated by the same reference numbers and those which are slightly different are designated by the same reference numbers with the suffix B.

Figure 8:
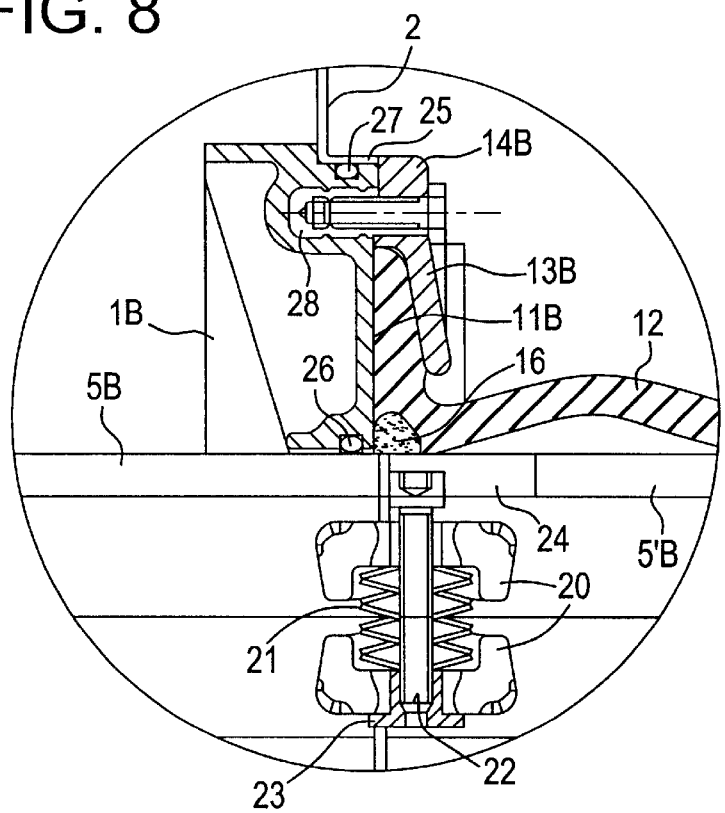
Figure 9:
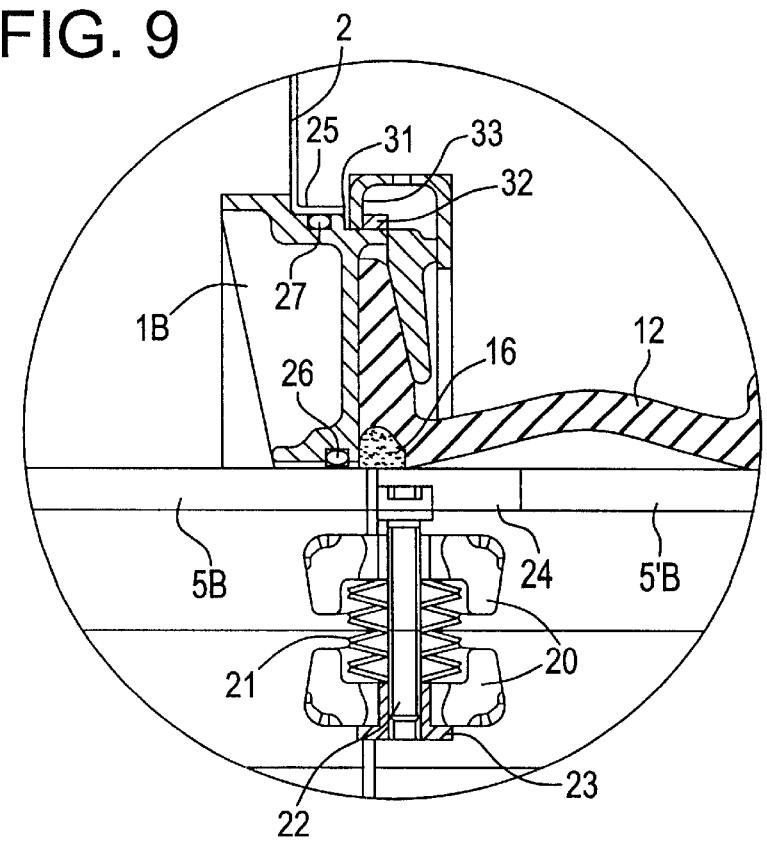

As previously, the aligned axial conductors 5B, 5'B to be connected have an outside connecting end which includes a cavity 7B or 7'B, which in this embodiment extends the length of the conductor, which takes the form of a cylindrical tube. An axial conductor 5B in the form of a tube can be cross the enclosure into which it penetrates, in which case it is carried by two aligned bushings mounted in opposite walls of the enclosure, which is not shown here. As in the variants described above, one conductor 5B is mounted so that its outside connecting end does not project much if at all from outside face 11B of the bushing 1B through which it passes, as can be seen in FIG. 8 in particular. In this case the other axial conductor 5'B to which it is to be connected projects outwardly from the outside face 11'B of the bushing 1'B through which it passes by an amount which is determined in practice by the same conditions as apply to the conductor 5'A. The interconnection device is identical to that for interconnecting the conductors 5A, 5'A and can be mounted on the longer conductor 5'B in the same manner as on the conductor 5'A. The interconnection device is used in exactly the same way as that described with reference to FIGS. 3 to 5 and its use is therefore not described again here. On the other hand, the conductors 5B, 5'B are mounted in the bushings that support them in a particularly simple manner, and the bushings 1B, 1'B can be made in a much simpler and less costly manner.

The bushings 1B, 1'B are mounted in openings in the enclosures which are analogous to those provided for the support members 4, 4' in the previous variants. The openings are conventionally circular and bordered by a peripheral flange which projects outwardly from the enclosure, for example perpendicularly to the wall, as can be seen in the detail FIGS. 8 and 9 in the case of the wall 2 of a enclosure which has a flange 25. The bushings 1B, 1'B take the form of injection molded thermoplastics material cylindrical members, for example, which have a tubular central passage whose diameter corresponds to the outside diameter of a tubular axial conductor 5B or 5'B. A circular seal 26 is housed in a circular inside groove of the central passage and is pressed against the axial conductor passing through it to provide a seal.

Another circular seal 27 is housed in a circular outside groove in the area whereby the bushing is a force-fit against the inside wall of the cylinder defined by the flange 25 of an opening provided in the enclosure for mounting a bushing. In this embodiment the bushings 1B, 1'B are stepped to enable a bushing to come into internal abutting engagement against the wall 2 on which it is mounted, with the cylindrical part carrying the circular seal 27 inside the cylinder defined by a flange 25 of the wall 2. The seal 27 provides the seal at this location.

In the embodiment shown in FIGS. 6 to 8, and as previously, the bushings 1B, 1'B include peripheral threaded inserts 28, 28' beyond their respective outside bearing faces for the flat end of the sleeve 12. The inserts 28, 28' are adapted to receive the threaded shanks of clamp fixing screws 14B, 14'B and in this embodiment they are at the periphery of the plane or possibly conical outside bearing face which is formed in the area intended to receive a complementary end of the sleeve 12.

Finally, and as shown diagrammatically in FIG. 7, a toroidal current transformer 17 can be disposed around the insulative sleeve 12 of a module, and this applies to each of the proposed embodiments of interconnection system modules according to the invention.

What claimed is:

1. A system for interconnecting one of medium-voltage and high-voltage electrical cells housed in shielded, gas-insulated and hermetically sealed enclosures, comprising:

sealed and insulative bushings having respective axial conductors, said respective axial conductors of said bushings being aligned in pairs and each having an accessible outside connecting end;

an interconnecting device operable to electrically connect two adjacent ends of said axial conductors of adjoining bushings;

a flexible insulative sleeve of elastically adaptable length surrounding said interconnecting device, said sleeve approximately coaxial with said axial conductors; and a removable fixing device which fixes the bushing to each annular end of said sleeve, wherein said sleeve has a longitudinal central portion which includes a projecting annular fold forming a return spring, and between said central portion and at least one of two annular flat ends, a longitudinal zone which includes a re-entrant annular fold so that the inside surface of said sleeve is locally in contact with said axial conductor at said zone, said inside surface being covered by a semi-conductive layer that is equal to the same potential as the axial conductors.

2. The system according to claim 1, wherein the interconnecting device is mounted on the outside connecting end of a first axial conductor which projects outwardly by an amount less than the distance between the adjoining bushings of said conductors so that said interconnecting device can be partially housed inside a cavity provided at the outside connecting end of each of the two aligned axial conductors electrically connected by the device, the outside connecting end of the first axial conductor including a cavity with a predetermined depth that enables the interconnecting device to be inserted for disconnecting the two aligned axial conductors.

3. The system according to claim 1, wherein the sleeve is covered on the outside with a semiconductor coating that is grounded.

4. The system according to claim 1, wherein the sleeve has an annular semiconductor material electric field control insert at each end that bears against the end of said bushing and over the perimeter of the outside connecting end of the axial conductor that passes through said bushing.

5. The system according to claim 2, wherein the interconnecting device includes a conductive bush which has a cylindrical body with an extending threaded bore that screws into a threaded bore of a stepped blind end cavity at the closed end, which is provided for the bush in the outside connecting end of the first axial conductor to be connected, the cylindrical body of the bush continuing to be electrically connected via sliding contacts to the inside of the corresponding diameter stage of the cavity, the cylindrical body protrudes more or less according to how far the bush is screwed in, and the projecting end of the cylindrical body contacts the blind cavity of corresponding diameter formed at the outside connecting end of a second axial conductor, into which said cylindrical body penetrates when unscrewed sufficiently and connects the two axial conductors with which the cylindrical body simultaneously contacts.

6. The system according to claim 5, wherein an annular semiconductor material electric field control insert adapted to be positioned where the second axial conductor passes through the bushing has a radial shoulder co-operating with a peripheral bead of the bush so that the end of the sleeve, which is pressed onto the bushing through which the second axial conductor passes, is held away from the bushing when the bush is screwed in.

7. The system according to claim 2, wherein:
the interconnecting device includes an assembly of two contact half-shells which are elastically spread apart in order for each half-shell to contact the outside connecting ends of the two axial conductors having blind cavities to be connected, said two half-shells penetrate into said end cavities and are mounted on a screw; and
the assembly can be moved longitudinally at the substantially projecting outside connecting end of the first axial conductor between a position enabling the two half-shells to remain in contact with the axial conductors in the cavities of which the two half-shells are partially inserted and a position in which the two half-shells are inserted only in the cavity at the outside connecting end of the first axial conductor.

8. The system according to claim 2, wherein:
the interconnecting device includes an assembly of two contact half-shells which are elastically spread apart in order for each half-shell to contact the outside connecting ends of the two axial conductors of the hollow tube type to be connected, at an outside connecting end of the tube formed by each conductor, said two half-shells penetrate into the adjoining ends of the two tubes and are mounted on a screw;
the half-shells are mounted on the shank of the screw so that the half-shells are fastened to an outside connecting end of the tube of the first axial conductor which projects outwardly by an amount corresponding to the distance between the adjoining two bushings through which one of the tubes passes; and
the assembly can be moved longitudinally at the outside connecting end of the first axial conductor between a position enabling the two half-shells to remain in contact with the two tubes into which the two half-shells are partially inserted and a position in which the two half-shells are inserted only in the cavity at the substantially projecting outside connecting end of the tube forming the first axial conductor.

9. The system according to claim 8, wherein the hollow tubes comprising the axial conductors are respectively threaded into bushings each of which is force-fitted into a flange around an opening in a wall of an enclosure, each bushing including a circular outside groove in which is mounted a first circular seal providing a seal between the bushing and the flange into which the bushing is force-fitted and a circular inside groove in which is mounted a second circular seal providing a seal between the bushing and the tube which is threaded into the bushing.

10. The system according to claim 1, wherein the bushings of the axial conductors each have a circular, planar or conical bearing face for the flat end of the insulative sleeve.

11. The system according to claim 1, wherein a toroidal current transformer is mounted around the insulative sleeve.

* * * * *